United States Patent
Cho et al.

(10) Patent No.: US 11,245,914 B2
(45) Date of Patent: Feb. 8, 2022

(54) METHOD AND SYSTEM FOR HYBRID VIDEO CODING

(71) Applicant: LINE Plus Corporation, Seongnam-si (KR)

(72) Inventors: In Won Cho, Seongnam-si (KR); Seung Ho Jung, Seongnam-si (KR)

(73) Assignee: LINE PLUS CORPORATION, Gyeonggi-do (KR)

( * ) Notice: Subject to any disclaimer, the term of this patent is extended or adjusted under 35 U.S.C. 154(b) by 0 days.

(21) Appl. No.: 17/086,636

(22) Filed: Nov. 2, 2020

(65) Prior Publication Data

US 2021/0144394 A1 May 13, 2021

(30) Foreign Application Priority Data

Nov. 7, 2019 (KR) .................. 10-2019-0141545

(51) Int. Cl.
*H04N 19/36* (2014.01)
*H04N 19/187* (2014.01)
*H04N 19/172* (2014.01)

(52) U.S. Cl.
CPC ........ *H04N 19/36* (2014.11); *H04N 19/172* (2014.11); *H04N 19/187* (2014.11)

(58) Field of Classification Search
USPC ................................. 375/240.16
See application file for complete search history.

(56) References Cited

U.S. PATENT DOCUMENTS

| | | | |
|---|---|---|---|
| 6,963,353 B1* | 11/2005 | Firestone | H04N 7/147 348/14.08 |
| 2006/0259552 A1* | 11/2006 | Mock | H04N 7/147 709/204 |
| 2006/0262846 A1* | 11/2006 | Burazerovic | H04N 19/136 375/240.2 |
| 2015/0016515 A1* | 1/2015 | Naccari | H04N 19/61 375/240.12 |
| 2015/0199789 A1* | 7/2015 | Laksono | G09G 5/39 345/520 |
| 2017/0013233 A1* | 1/2017 | Kuusela | H04N 7/0117 |
| 2018/0027039 A1* | 1/2018 | Moorthy | H04N 21/2401 709/219 |
| 2018/0262813 A1* | 9/2018 | Moorthy | H04N 21/2401 |
| 2018/0270284 A1* | 9/2018 | Lee | H04L 47/32 |
| 2019/0045251 A1* | 2/2019 | Shen | H04L 65/80 |
| 2020/0319097 A1* | 10/2020 | Nygren | H04N 5/332 |

FOREIGN PATENT DOCUMENTS

KR  10-2014-0145114 A  12/2014

* cited by examiner

*Primary Examiner* — Behrooz M Senfi
(74) *Attorney, Agent, or Firm* — Harness, Dickey & Pierce, P.L.C.

(57) ABSTRACT

Disclosed are a methods and/or systems for hybrid video coding. A hybrid video coding method may include generating scaled-down video frames by scaling down frames of an original video, generating a stream of a first layer by encoding the scaled-down video frames using a first encoder of a software codec, and generating a stream of a second layer using the frames of the original video and a second encoder of a hardware codec.

5 Claims, 9 Drawing Sheets

METHOD AND SYSTEM FOR HYBRID VIDEO CODING

CROSS-REFERENCE TO RELATED APPLICATIONS

This U.S. non-provisional application and claims the benefit of priority under 35 U.S.C. § 119 to Korean Patent Application No. 10-2019-0141545, filed Nov. 7, 2019, the entire contents of which are incorporated herein by reference in their entirety.

BACKGROUND

Technical Field

One or more example embodiments relate to methods and/or systems for hybrid video coding.

Related Art

A codec refers to hardware or software capable of processing encoding or decoding or processing all of encoding and decoding of data streams or signals of audio or video. A software codec relates to processing encoding and/or decoding in a software manner. The software codec has flexibility in that it is possible to add a new function or change a function according to a situation and may easily recover damaged data on a network and have a high compatibility and stability. However, compared to a hardware codec, the software codec may use a relatively large amount of central processing unit (CPU) resources and have a slow encoding and decoding rate. The hardware codec relates to processing encoding and decoding through a hardware logic and may have a fast encoding and decoding rate and may not affect a CPU performance. However, the hardware codec may be static and may perform only functions added at the time of initial production. Accordingly, the hardware codec is generally used for a mobile device, such as a smartphone having a relatively degraded CPU performance and the software codec is generally used for a device, such as, a desktop.

In the related art, the use of a codec in a mobile device, such as a smartphone, has been applied for video transmission between mobile devices, such as a video call between smartphones. In the recent times, there is an increasing demand to transmit a video from a mobile device, such as broadcasting using a smartphone, to various devices requiring various resolutions, such as a desktop, as well as another mobile device. However, to encode each of videos with various resolutions and transmit the encoded video from a mobile device, such as a smartphone, over a network, the use of a software codec is required. The transmission of duplicate videos with different resolutions may increase network traffic as well as a network data usage.

SUMMARY

Some example embodiments provide hybrid video coding methods and/or systems that may fuse advantages of a hybrid codec and a software codec.

According to an aspect of at least one example embodiment, there is provided a hybrid video coding method of a computer apparatus including at least one processor. The hybrid video coding method includes, by the at least one processor, generating scaled-down video frames by scaling down frames of an original video, generating a stream of a first layer by encoding the scaled-down video frames using a first encoder of a software codec, and generating a stream of a second layer using the frames of the original video and using a second encoder of a hardware codec.

The hybrid video coding method may further include, by the at least one processor, decoding the scaled-down video frames encoded using the first encoder, using a decoder of the software codec, and generating scaled-up video frames by scaling up the decoded scaled-down video frames.

The generating of the stream of the second layer may include generating differential images between the frames of the original video and the scaled-up video frames, and generating the stream of the second layer by encoding the generated differential images using the second encoder.

The generating of the differential images may include calibrating a first range of pixel values of the differential images to be a second range of pixel values of the frames of the original video or a third range of pixel values of the scaled-up video frames.

The first range may range from $-(n+n+1)$ to $(n+n+1)$, and the second range or the third range may range from 0 to $(n+n+1)$, and the calibrating may include changing a pixel value of less than $-(n+1)$ with a pixel value of $-(n+1)$ and changing a pixel value of greater than n with a pixel value of n among the pixel values of the differential images, and adding n to each of the pixel values of the differential images. Here, the n denotes a natural number.

The hybrid video coding method may further include, by the at least one processor, transmitting at least one of the stream of the first layer and the stream of the second layer based on a resolution requested from a reception apparatus.

According to an aspect of at least one example embodiment, there is provided a hybrid video coding method of a computer apparatus including at least one processor. The hybrid video coding method includes, by the at least one processor, receiving a stream of a first layer and a stream of a second layer generated for an original video from a transmission apparatus, generating scaled-down video frames by decoding the stream of the first layer using a first decoder of a software codec, generating differential images by decoding the stream of the second layer using a second decoder of a hardware codec, and restoring frames of the original video through the scaled-down video frames and the differential images.

According to an aspect of at least one example embodiment, there is provided a non-transitory computer-readable record medium storing instructions that, when executed by a processor, cause the processor to perform the hybrid video coding method.

According to an aspect of at least one example embodiment, there is provided a computer apparatus including at least one processor configured to execute computer-readable instructions. The at least one processor is configured to generate scaled-down video frames by scaling down frames of an original video, generate a stream of a first layer by encoding the scaled-down video frames using a first encoder of a software codec, and generate a stream of a second layer using the frames of the original video and using a second encoder of a hardware codec.

According to an aspect of at least one example embodiment, there is provided a computer apparatus including: at least one processor configured to execute computer-readable instructions. The at least one processor is configured to receive a stream of a first layer and a stream of a second layer generated for an original video from a transmission apparatus, generate scaled-down video frames by decoding the stream of the first layer using a first decoder of a software codec, generate differential images by decoding the stream of the second layer using a second decoder of a hardware codec, and restore frames of the original video based on the scaled-down video frames and the differential images.

According to some example embodiments, there may be provided hybrid video coding methods and/or systems in which advantages of a hardware codec and a software codec are fused.

According to some example embodiments, it is possible to reduce transmission of redundant data in transmitting videos of various resolutions for a single video.

Further areas of applicability will become apparent from the description provided herein. The description and specific examples in this summary are intended for purposes of illustration only and are not intended to limit the scope of the present disclosure.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

A hybrid video coding system according to example embodiments may be implemented by at least one computer apparatus, and a hybrid video coding method according to the example embodiments may be performed through at least one computer apparatus included in the hybrid video coding system. Here, a computer program according to an example embodiment may be installed and executed on the computer apparatus and the computer apparatus may perform the hybrid video coding method under control of the executed computer program. The computer program may be stored in a non-transitory computer-readable record medium to implement the hybrid video coding method on a computer in conjunction with the computer apparatus.

Figure 1:
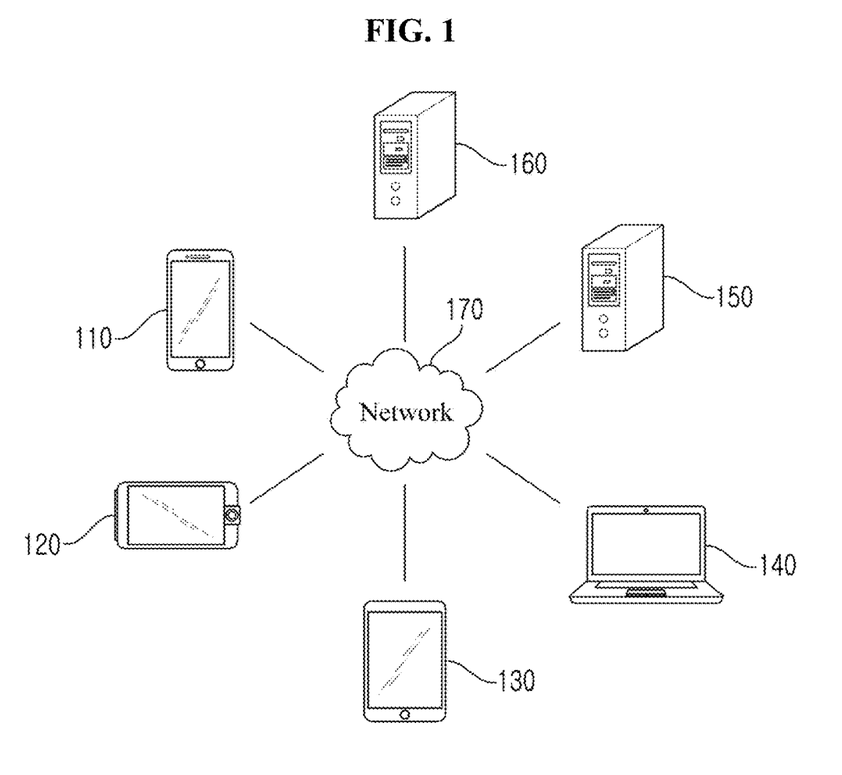
FIG. 1 is a diagram illustrating an example of a network environment according to at least one example embodiment.

FIG. 1 illustrates an example of a network environment according to at least one example embodiment. Referring to FIG. 1, the network environment may include a plurality of electronic devices 110, 120, 130, and 140, a plurality of servers 150 and 160, and a network 170. FIG. 1 is provided as an example only. A number of electronic devices or a number of servers is not limited thereto. Also, the network environment of FIG. 1 is provided as an example only among environments applicable to the example embodiments. An environment applicable to the example embodiments is not limited to the network environment of FIG. 1.

Each of the plurality of electronic devices 110, 120, 130, and 140 may be a fixed terminal or a mobile terminal that is configured as a computer apparatus. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet PC, and the like. For example, although FIG. 1 illustrates a shape of a smartphone as an example of the electronic device 110, the electronic device 110 used herein may refer to one of various types of physical computer apparatuses capable of communicating with other electronic devices 120, 130, and 140, and/or the servers 150 and 160 over the network 170 in a wireless or wired communication manner.

The communication scheme is not limited and may include a near field wireless communication scheme between devices as well as a communication scheme using a communication network (e.g., a mobile communication network, wired Internet, wireless Internet, a broadcasting network, etc.) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), and Internet. Also, the network 170 may include at least one of network topologies that include a bus network, a star network, a ring network, a mesh network, a star-bus network, a tree or hierarchical network, and the like. However, they are provided as examples only.

Each of the servers 150 and 160 may be configured as a computer apparatus or a plurality of computer apparatuses that provides an instruction, a code, a file, content, a service, etc., through communication with the plurality of electronic devices 110, 120, 130, and 140 over the network 170. For example, the server 150 may be a system that provides a service to the plurality of electronic devices 110, 120, 130, and 140 connected over the network 170. Here, the service may include, for example, a group call service or an audio conferencing service, a messaging service, a mail service, a social network service (SNS), a map service, a translation service, a financial service, a payment service, a search service, and a content providing service.

Figure 2:
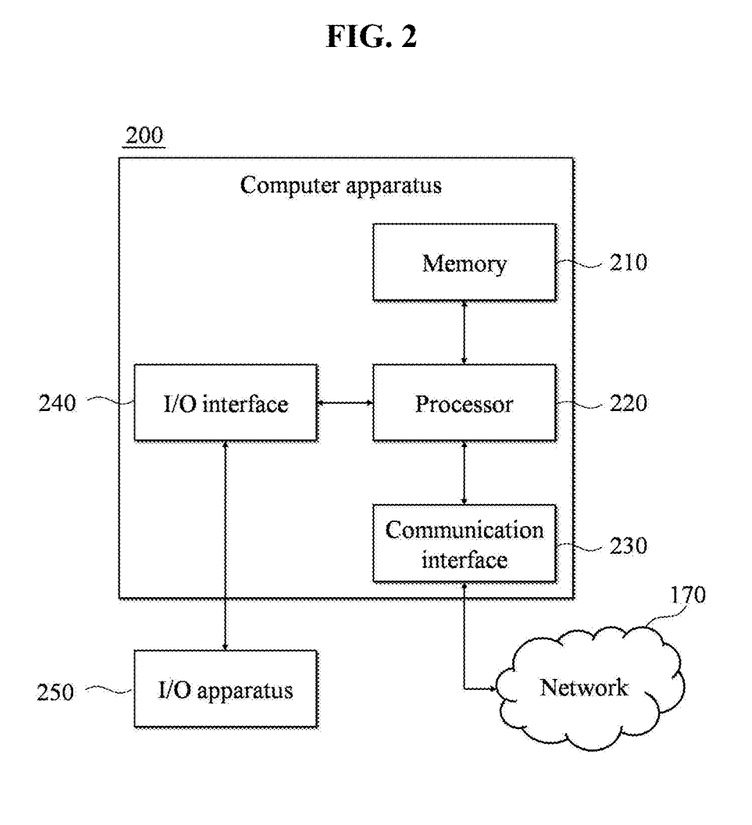
FIG. 2 is a diagram illustrating an example of a computer apparatus according to at least one example embodiment.

FIG. 2 is a block diagram illustrating an example of a computer apparatus according to at least one example embodiment. Each of the plurality of electronic devices 110, 120, 130, and 140 or each of the servers 150 and 160 may be implemented by a computer apparatus 200 of FIG. 2.

Referring to FIG. 2, the computer apparatus 200 may include a memory 210, a processor 220, a communication interface 230, and an input/output (I/O) interface 240. The memory 210 may include a permanent mass storage device, such as a random access memory (RAM), a read only memory (ROM), and a disk drive, as a non-transitory computer-readable storage medium. The permanent mass storage device, such as ROM and disk drive, may be included in the computer apparatus 200 as a permanent storage device separate from the memory 210. Also, an OS and at least one program code may be stored in the memory 210. The software components may be loaded to the memory 210 from another non-transitory computer-readable medium separate from the memory 210. The other non-transitory computer-readable storage medium may include a non-transitory computer-readable storage medium, for example, a floppy drive, a disk, a tape, a DVD/CD-ROM drive, a memory card, etc. According to other example embodiments, software components may be loaded to the memory 210 through the communication interface 230 instead of, or in addition to, the non-transitory computer-readable storage medium. For example, software components may be loaded to the memory 210 of the computer apparatus 200 based on a computer program installed by files received over the network 170.

The processor 220 may be configured to process computer-readable instructions of a computer program by performing basic arithmetic operations, logic operations, and I/O operations. The computer-readable instructions may be provided from the memory 210 or the communication interface 230 to the processor 220. For example, the processor 220 may be configured to execute received instructions in response to the program code stored in the storage device, such as the memory 210.

The communication interface 230 may provide a function for communication between the computer apparatus 200 and another apparatus, for example, the aforementioned storage devices, over the network 170. For example, the processor 220 of the electronic apparatus 200 may transfer data, a file, a request or an instruction created based on the program code stored in the storage device, such as the memory 210, to other apparatuses over the network 170 under control of the communication interface 230. Inversely, a signal, an instruction, data, a file, etc., from the other apparatus may be received at the computer apparatus 200 through the communication interface 230 of the computer apparatus 200 by going through the network 170. For example, a signal, an instruction, data, etc., received through the communication interface 230 may be transferred to the processor 220 or the memory 210, and a file, etc., may be stored in a storage medium, for example, the permanent mass storage device, further includable in the computer apparatus 200.

The I/O interface 240 may be a device used for interface with an I/O apparatus 250. For example, an input device may include a device, such as a microphone, a keyboard, a mouse, and the like, and an output device may include a device, such as a display, a speaker, and the like. As another example, the I/O interface 240 may be a device for interface with an apparatus in which an input function and an output function are integrated into a single function, such as a touchscreen. At least one I/O apparatus 250 may be configured as a single apparatus with the computer apparatus 200. For example, a touchscreen, a microphone, and a speaker may be included in the computer apparatus 200, such as a smartphone.

According to example embodiments, the computer apparatus 200 may include a number of components greater than or less than a number of components shown in FIG. 2. However, there is no need to clearly illustrate many of the conventional components. For example, the computer apparatus 200 may be configured to include at least a portion of the I/O apparatus 250 or may further include other components, such as, a transceiver and a database.

Figure 3:
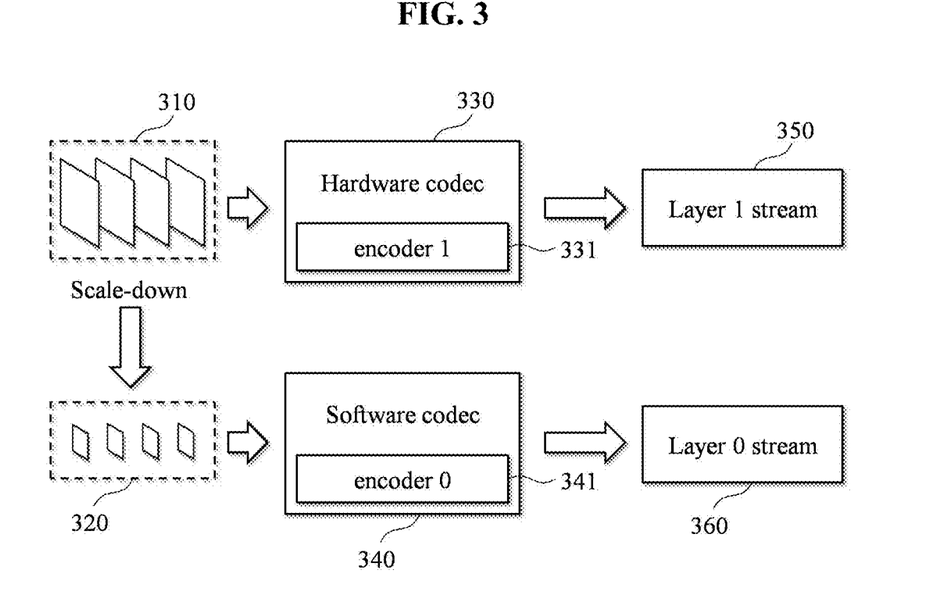
FIG. 3 illustrates an example of a hybrid video coding process according to at least one example embodiment.

FIG. 3 illustrates an example of a hybrid video coding process according to at least one example embodiment. FIG. 3 illustrates an example of generating scaled-down video frames 320 by scaling down frames 310 of an original video. Here, the frames 310 of the original video may be frames of Layer 1 and the scaled-down video frames 320 may be frames of Layer 0. Although the present example embodiment and the following example embodiments use frames of two layers, that is, the frames 310 of the original video of Layer 1 and the scaled-down video frames 320 of Layer 0, frames for each of at least three layers may be generated and used depending on example embodiments.

A transmission apparatus to transmit a video may include all of a hardware codec 330 and a software codec 340. Here, the transmission apparatus may generate a stream 350 of Layer 1 (Layer 1 stream) by encoding the frames 310 of the original video using an encoder 1 331 of the hardware codec 330 and may generate a stream 360 of Layer 0 (Layer 0 stream) by encoding the scaled-down video frames 320 using an encoder 0 341 of the software codec 340. In this case, the transmission apparatus may transmit the generated Layer 1 stream 350 and Layer 0 stream 360 to reception apparatuses that require different resolutions over the network 170, respectively. Here, each of the transmission apparatus and the reception apparatuses may be implemented through the computer apparatus 200 of FIG. 2.

As described above, the transmission apparatus may process encoding of the frames 310 of the original video that requires a high performance and a large computational amount using the hardware codec 330 and may process encoding of the scaled-down video frames 320 that requires a relatively low performance and a small computational amount and needs to be robust against errors, using the software codec 340. That is, by fusing advantages of the hardware codec 330 and the software codec 340, the transmission apparatus may use the software codec 340 even in an apparatus having a relatively low CPU performance and may also provide video contents with various resolutions.

Figure 4:
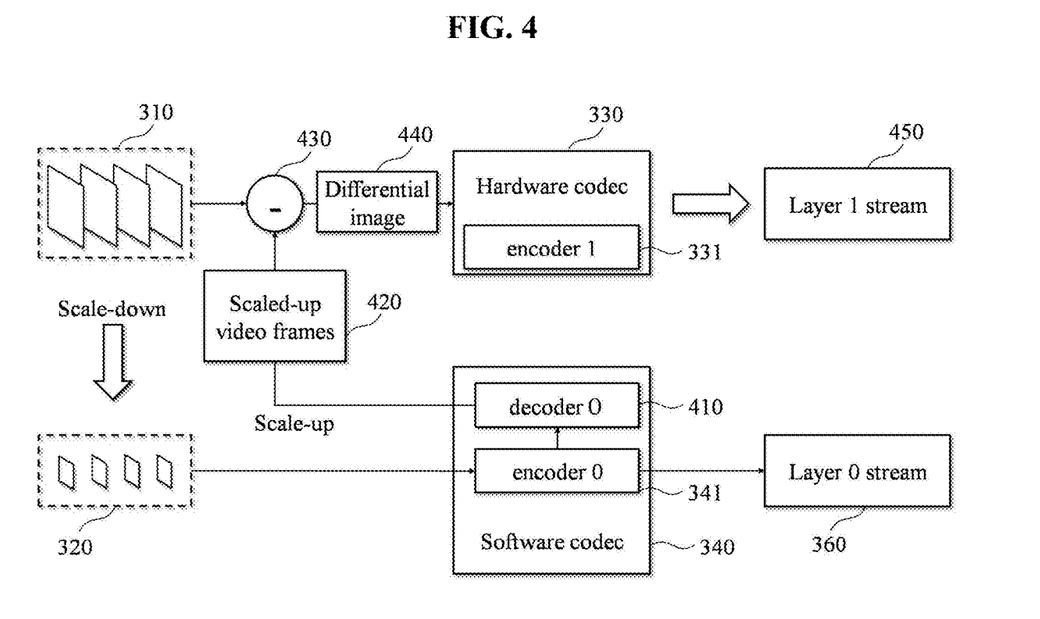
FIG. 4 illustrates another example of a hybrid video coding process according to at least one example embodiment.

FIG. 4 illustrates another example of a hybrid video coding process according to at least one example embodiment. A mobile device, such as a smartphone, can provide various resolution versions of the same video, but this may trigger an increase in data usage and network traffic due to redundant transmission of data. Accordingly, there is a need to reduce the redundancy for various resolution versions about the same video.

As described above with reference to FIG. 3, the transmission apparatus may generate the Layer 0 stream 360 by encoding the scaled-down video frames 320 using the encoder 0 341 of the software codec 340. In this case, the transmission apparatus may generate scaled-up video frames 420 by decoding data (e.g., the scaled-down video frames 320) encoded using the encoder 0 341, using a decoder 0 410 included in the software codec 340 and by scaling up the decoded data. The transmission apparatus may generate differential images 440 between the frames 310 of the original video and the scaled-up video frames 420 using a differential image generator 430, and may generate a Layer 1 stream 450 by encoding the generated differential images 440 using the encoder 1 331 of the hardware codec 330. For example, the differential image 440 may be generated based on a difference in a pixel value between a pixel of each of the frames 310 of the original video and a pixel of the scaled-up video frames 420 corresponding thereto. Here, a single differential image 440 may be generated every two frames corresponding to each other among the frames 310 of the original video and the scaled-up video frames 420.

Here, the Layer 1 stream 350 of FIG. 3 is data acquired by encoding the frames 310 of the original video, whereas the Layer 1 stream 450 is data acquired by encoding the differential images 440. Therefore, duplication with the Layer 0 stream 360 may be minimized.

In this case, a mobile device, such as a smartphone, serving as a reception apparatus, may receive the Layer 0 stream 360 and may play the scaled-down video frames 320. A device, such as a desktop, serving as the reception apparatus, may receive all of the Layer 0 stream 360 and the Layer 1 stream 450 and then may restore and play the frames 310 of the original video.

For example, the reception apparatus may acquire frames corresponding to the scaled-up video frames 420 by decoding the Layer 0 stream 360 using a software codec of the reception apparatus and then scaling up decoded data. Also, the reception apparatus may acquire the differential images 440 by decoding the Layer 1 stream 450 using a hardware codec of the reception apparatus. In this case, the reception apparatus may restore and play the frames 310 of the original video through the Layer 1 stream 450 and the differential images 440.

As described above, the differential image 440 may be generated based on a difference in a pixel value between a pixel of each of the frames 310 of the original video and a pixel of each of the scaled-up video frames 420 corresponding thereto. Here, the range of a pixel value of the differential image 440 doubles the range of operand data. For example, if an existing pixel value is expressed in the range of 1 byte (0 to 255), a difference between pixel values is expressed in the range of 2 bytes (−255 to 255). In this case, to use an additional byte for each pixel value for the differential image 440 may degrade the performance according to "quality per bit."

Accordingly, difference values between pixel values may be calibrated such that the range of difference values between pixel values may correspond to the range of operand data.

Figure 5:
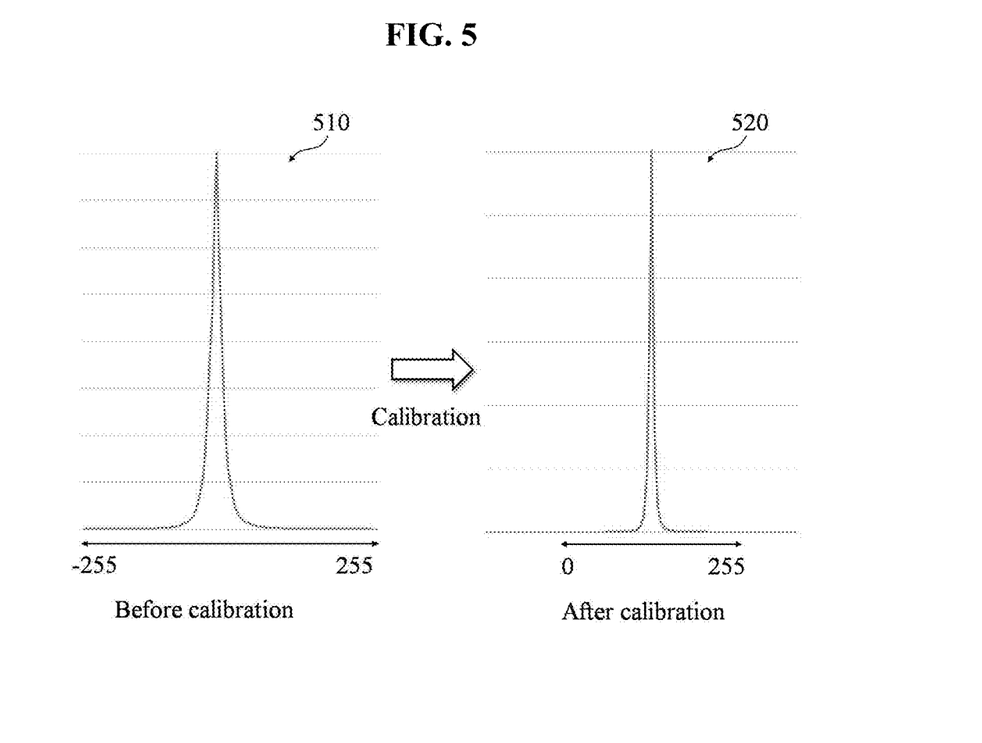
FIG. 5 illustrates an example of a graph showing a frequency distribution of difference values between pixel values according to at least one example embodiment.

FIG. 5 illustrates an example of a graph showing a frequency distribution of difference values between pixel values according to at least one example embodiment. Referring to FIG. 5, a first graph 510 represents a histogram corresponding to a case in which pixel values of the differential image 440 are calculated in the range of −255 to 255 based on a difference in a pixel value between a pixel of each of the frames 310 of the original video and a pixel of each of the scaled-up video frames 420 corresponding thereto. Here, a y axis represents an example of a number of times each pixel value appears in the differential image 440. It can be known that most of pixel values of the differential image 440 are close to 0. A second graph 520 represents a histogram corresponding to a case in which pixel values of the differential image 440 are calibrated such that the pixel values of the differential image 440 may be included in the range of 0 to 255. For example, the transmission apparatus may change all of pixel values ranging from −255 to −128 with a pixel value at −128, may change all of pixel values ranging from 128 to 255 with a pixel value at 127, and accordingly, may change the pixel values of the differential image 440 such that all of the pixel values of the differential image 440 may be included in the range of −128 to 127. In the first graph 510, a number of pixel values within the range of −255 to −128 and a number of pixel values within the range of 128 to 255 are not large and thus, the overall quality may not be greatly affected. The transmission apparatus may shift the range by adding 128 to each of pixel values of the differential image 440 included in the range of −128 to 127 and accordingly, may calibrate the pixel values of the differential image 440 to be included in the range of 0 (=−128+128) to 255 (=127+128).

Figure 6:
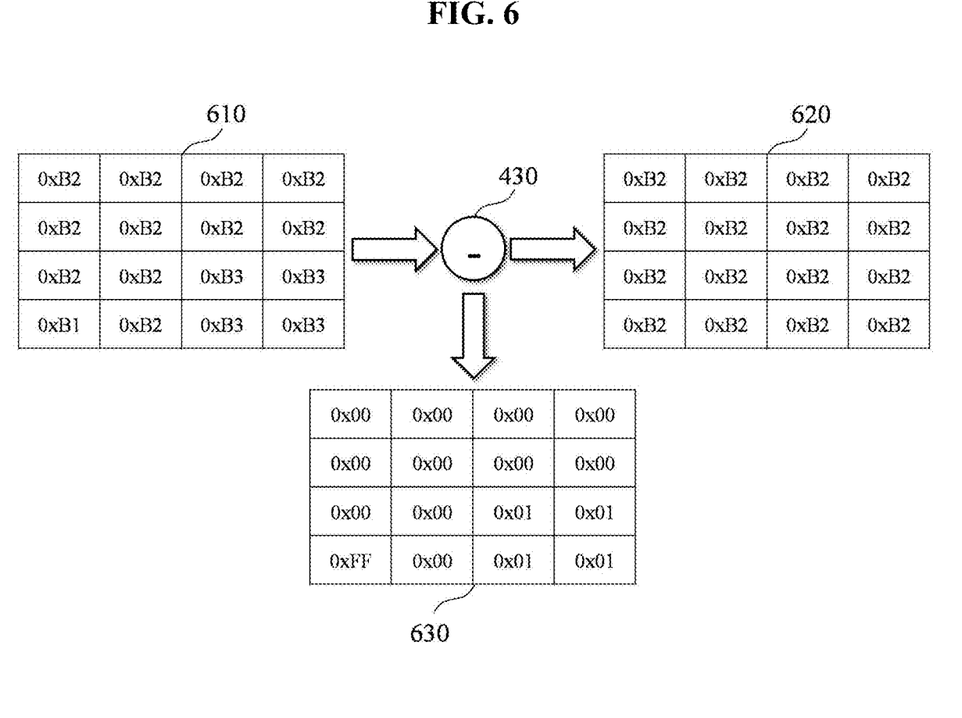
FIG. 6 illustrates an example of generating a differential image according to at least one example embodiment.

FIG. 6 illustrates an example of generating a differential image according to at least one example embodiment. FIG. 6 illustrates an example of generating a first differential image 630 by subtracting pixel values of a distorted image 620 from pixel values of an original image 610 using the differential image generator 430. Here, the original image 610 may be a single frame among the frames 310 of the original video and the distorted image 620 may be a frame corresponding to the original image 610 among the scaled-up video frames 420. A pixel value is expressed in hexadecimal within the range of 1 byte (0 to 255 in decimal and 0x00 to 0xFF in hexadecimal).

Referring to FIG. 6, if a pixel '0xB2' at a location {$1^{st}$ column, $4^{th}$ row} of the distorted image 620 is subtracted from a pixel value '0xB1' at a location {$1^{st}$ column, $4^{th}$ row} of the original image 610, a value of '−1' should appear. However, if '−1' is expressed in hexadecimal within the range of 1 byte, a value corresponding to '255' such as a pixel value '0xFF' at a location {$1^{st}$ column, $4^{th}$ row} of the first differential value 630 appears since '−1' is a value that cannot be expressed in the range of '0 to 255.'

Figure 7:
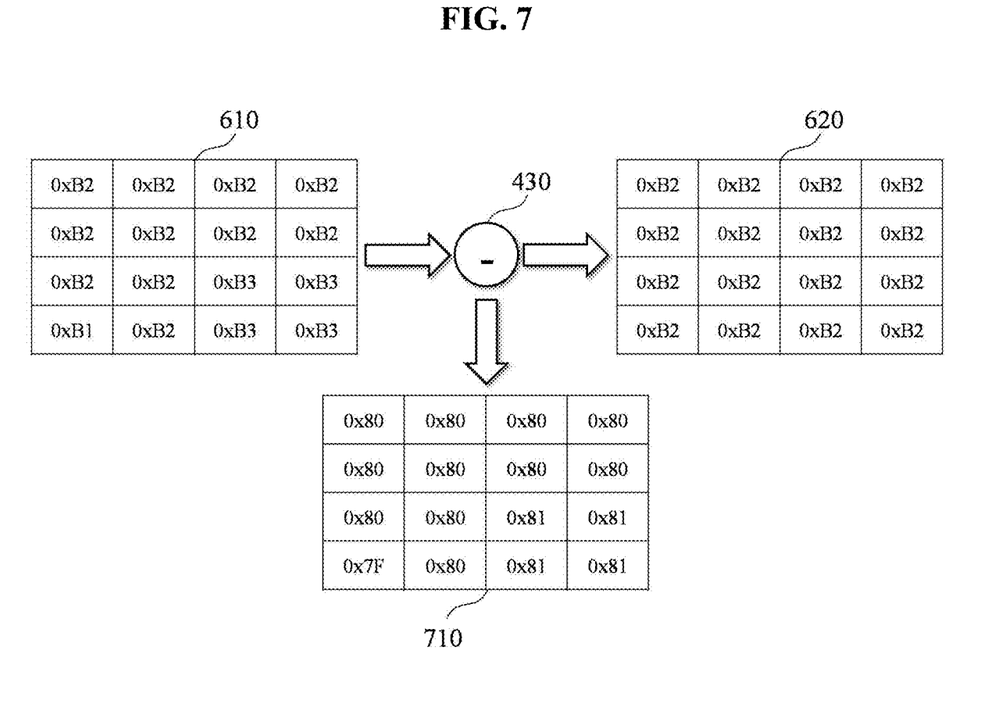
FIG. 7 illustrates an example of calibrating a pixel value of a differential image according to at least one example embodiment.

FIG. 7 illustrates an example of calibrating a pixel value of a differential image according to at least one example embodiment. FIG. 7 illustrates an example of generating a second differential image 710 by adding '0x80 (128 in decimal)' to each of the pixel values of the first differential image 630 and by calibrating the pixel values to be included in the range of 0x00 to 0xFF in hexadecimal (the range of 0 to 255 in decimal). In the second differential image 710, −128 may be mapped to '0x00,' 127 may be mapped to '0xFF,' and 0 may be mapped to '0x80.' Accordingly, the range of −128 to 127 may be shifted to the range of 0 to 255, that is, the range of 1 byte.

Figure 8:
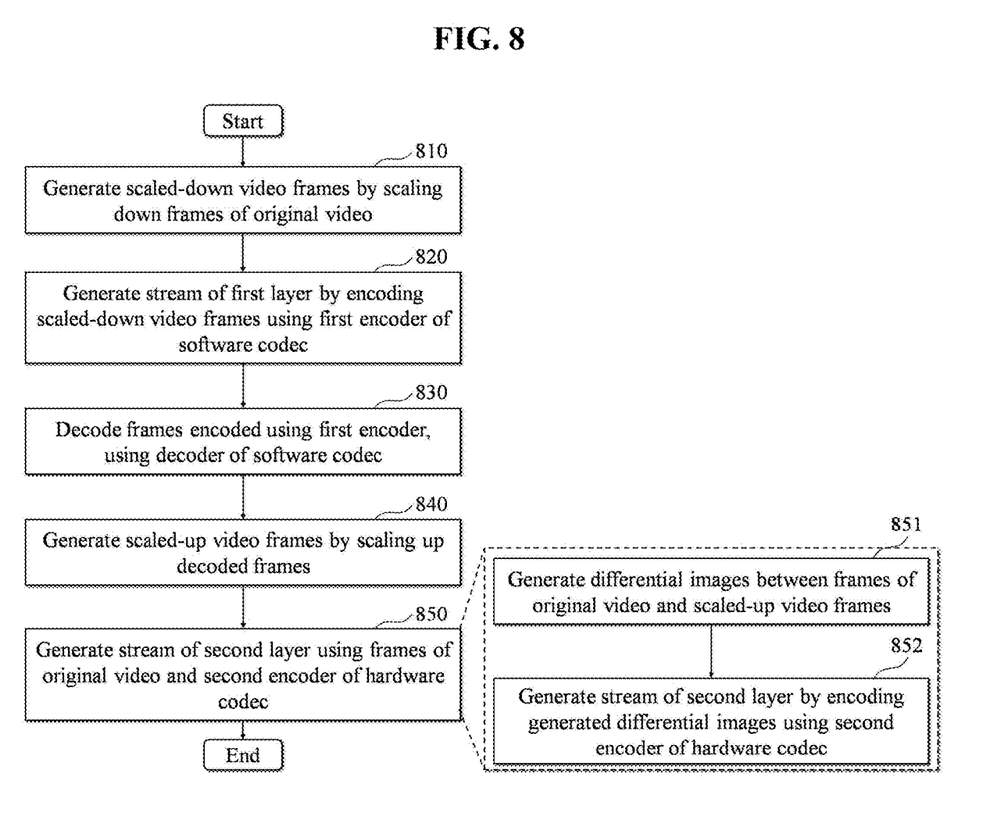
FIG. 8 is a flowchart illustrating an example of a hybrid video coding method of a transmission apparatus according to at least one example embodiment.

FIG. 8 is a flowchart illustrating an example of a hybrid video coding method of a transmission apparatus according to at least one example embodiment. The hybrid video coding method according to the example embodiment may be performed by the computer apparatus 200 that implements the aforementioned transmission apparatus. In this case, the processor 220 of the computer apparatus 200 may be configured to execute a control instruction according to a code of at least one program or a code of an OS included in the memory 210. Here, the processor 220 may control the computer apparatus 200 to perform operations 810, 820, 830, 840, 850, 851, and 852 included in the hybrid video coding method of FIG. 8 in response to a control instruction provided from a code stored in the computer apparatus 200.

Referring to FIG. 8, in operation 810, the computer apparatus 200 may generate scaled-down video frames by scaling down frames of an original video. An example of generating the scaled-down video frames 320 by scaling down the frames 310 of the original video is described above with reference to FIGS. 3 and 4.

In operation 820, the computer apparatus 200 may generate a stream of a first layer by encoding the scaled-down video frames using a first encoder of a software codec. An example of generating the Layer 0 stream 360 by encoding the scaled-down video frames 320 using the encoder 0 341 of the software codec 340 is described above with reference to FIGS. 3 and 4.

In operation 830, the computer apparatus 200 may decode frames encoded using the first encoder, using a decoder of the software codec. An example of decoding the frames encoded using the encoder 0 341 of the software codec 340 through the decoder 0 410 is described above with reference to FIGS. 3 and 4.

In operation 840, the computer apparatus 200 may generate scaled-up video frames by scaling up the decoded frames. An example of generating the scaled-up video frames 420 by scaling up the decoded frames is described above with reference to FIG. 4.

Operations 830 and 840 may be performed by the computer apparatus 200 in an example embodiment of generating and using the differential image 440 of FIG. 4. If the differential image 440 is not used, operations 830 and 840 may be omitted.

In operation 850, the computer apparatus 200 may generate a stream of a second layer using the frames of the original video and a second encoder of a hardware codec. For example, in the case of not generating and using the differential image 440 of FIG. 4, the computer apparatus 200 may generate the stream of the second layer by encoding the frames of the original video using the second encoder of the hardware codec. On the contrary, in the case of generating and using the differential image 440 of FIG. 4, operation 850 may include operations 851 and 852.

In operation 851, the computer apparatus 200 may generate differential images between the frames of the original video and the scaled-up video frames. For example, the computer apparatus 200 may generate the differential images based on differences in pixel values between the frames of the original video and the scaled-up video frames present at corresponding locations. Here, a single differential image may be generated every two frames corresponding to each other among the frames of the original video and the scaled-up video frames.

Here, the computer apparatus 200 may calibrate a first range of pixel values of the differential images to be a second range of pixel values of the frames of the original video or a third range of pixel values of the scaled-up video frames. For example, the second range or the third range may range from 0 to (n+n+1), and the first range may range from −(n+n+1) to (n+n+1). Here, n denotes a natural number. In this case, the computer apparatus 200 may change a pixel value of less than −(n+1) with a pixel value of −(n+1), may change a pixel value of greater than n with a pixel value of n among the pixel values of the differential images, and may add n to each of the pixel values of the differential images. In this manner, the computer apparatus 200 may calibrate the first range of the pixel values of the differential images to range from 0 to (n+n+1). An example embodiment in which n=127 for a size of 1 byte is described above with reference to FIGS. 6 and 7.

In operation 852, the computer apparatus 200 may generate the stream of the second layer by encoding the generated differential images using the second encoder of the hardware codec. In this case, since a stream generated by encoding differential images mostly having a value of '0' is used instead of using a stream generated by encoding the frames of the original video, it is possible to minimize redundant transmission of data although different resolution versions are provided for the same video.

Further, the computer apparatus 200 may transmit at least one of the stream of the first layer and the stream of the second layer based on a resolution requested from a reception apparatus. For example, if the reception apparatus requests a stream of a low resolution, the computer apparatus 200 may transmit, to the reception apparatus, the stream of the first layer generated by encoding the scaled-down video frames. On the contrary, if the reception apparatus requests a stream of a high resolution, the computer apparatus 200 may transmit, to the reception apparatus, the stream of the second layer generated by encoding the frames of the original video. If the differential images are used, the computer apparatus 200 may transmit all of the stream of the first layer and the stream of the second layer such that the reception apparatus may restore the frames of the original video through the stream of the first layer and the stream of the second layer.

Figure 9:
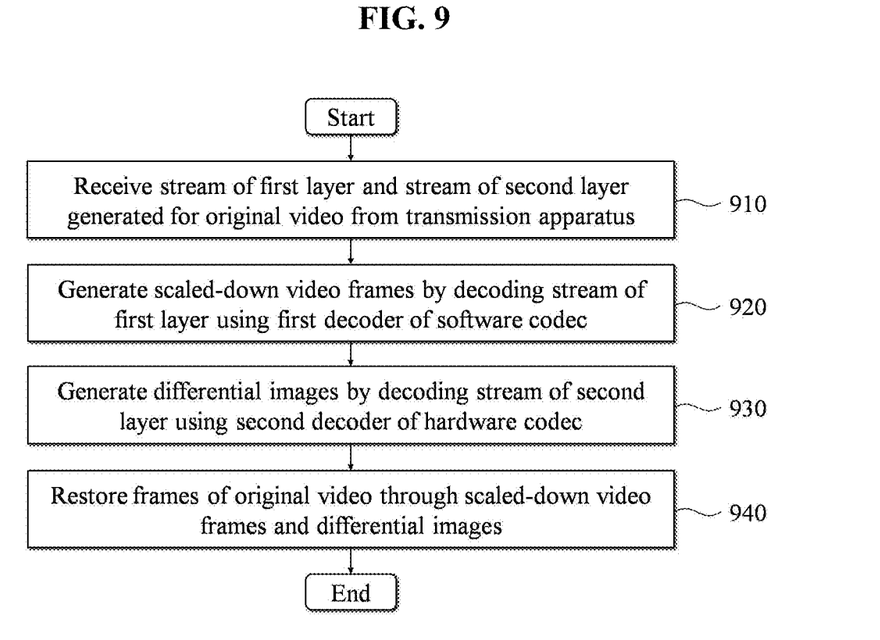
FIG. 9 is a flowchart illustrating an example of a hybrid video coding method of a reception apparatus according to at least one example embodiment.

FIG. 9 is a flowchart illustrating an example of a hybrid video coding method of a reception apparatus according to at least one example embodiment. The hybrid video coding method according to the example embodiment may be performed by the computer apparatus 200 that implements the aforementioned reception apparatus. In this case, the processor 220 of the computer apparatus 200 may be configured to execute a control instruction according to a code of at least one program or a code of an OS included in the memory 210. Here, the processor 220 may control the computer apparatus 200 to perform operations 910 to 940 included in the hybrid video coding method of FIG. 9 in response to a control instruction provided from a code stored in the computer apparatus 200.

Referring to FIG. 9, in operation 910, the computer apparatus 200 may receive a stream of a first layer and a stream of a second layer generated for an original video from a transmission apparatus. As described above, the stream of the first layer may be generated at the transmission apparatus by encoding scaled-down video frames generated by scaling down frames of the original video using a first encoder of a software codec of the transmission apparatus. Also, the stream of the second layer may be generated using the frames of the original video and a second encoder of a hardware codec. In the example embodiment, the stream of the second layer may be generated by encoding the differential image using the second encoder of the hardware codec of the transmission apparatus. Here, the differential images may be generated based on differences in pixel values between the frames of the original video and the scaled-up video frames. Here, the scaled-up video frames may be generated by decoding the frames encoded using the first encoder of the software codec of the transmission apparatus using a decoder of the software codec of the transmission apparatus and by scaling up the decoded frames.

In operation 920, the computer apparatus 200 may generate scaled-down video frames by decoding the stream of the first layer using a first decoder of a software codec. As described above, the stream of the first layer may be generated by encoding the scaled-down video frames generated by scaling down the frames of the original video using the first encoder of the software codec of the transmission apparatus. The computer apparatus 200 may acquire the scaled-down video frames by decoding the stream of the first layer using the first decoder of the software codec.

In operation 930, the computer apparatus 200 may generate differential images by decoding the stream of the second layer using a second decoder of a hardware codec. Here, the differential images may be generated at the transmission apparatus based on differences in pixel values between the frames of the original video and the scaled-up video frames. Here, if the range of pixel values of the differential images is shifted and thereby calibrated as described above with reference to FIG. 7, the computer apparatus 200 may calibrate the range of pixel values of the differential images to return to the original range. For example, since '0x80' in hexadecimal is added to each of the pixel values in FIG. 7, the computer apparatus 200 may recalibrate the range of the pixel values of the differential images to return to the original range by subtracting '0x80' from each of the pixel values of the generated differential images.

In operation 940, the computer apparatus 200 may restore the frames of the original video through (e.g., based on) the scaled-down video frames and the differential images. For example, the computer apparatus 200 may generate scaled-up video frames by scaling up the scaled-down video frames, and may restore the frames of the original video by adding pixel values of the differential images present at corresponding locations to pixel values of the scaled-up video frames. The computer apparatus 200 may play the original video using the restored frames of the original video.

According to some example embodiments, there may be provided a hybrid video coding method and system in which advantages of a hardware codec and a software codec are fused. Also, it is possible to reduce transmission of redundant data in transmitting videos of various resolutions for a single video.

The systems or apparatuses described above may be implemented using hardware components or a combination of hardware components and software components. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable storage mediums.

The methods according to the above-described example embodiments may be configured in a form of program instructions performed through various computer devices and recorded in non-transitory computer-readable media. The media may also include, alone or in combination with the program instructions, data files, data structures, and the like. The media may continuously store computer-executable programs or may temporarily store the same for execution or download. Also, the media may be various types of recording devices or storage devices in a form in which one or a plurality of hardware components are combined. Without being limited to media directly connected to a computer system, the media may be distributed over the network. Examples of the media include magnetic media such as hard disks, floppy disks, and magnetic tapes; optical media such as CD-ROM and DVDs; magneto-optical media such as floptical disks; and hardware devices that are specially configured to store and perform program instructions, such as read-only memory (ROM), random access memory (RAM), flash memory, and the like. Examples of other media may include recording media and storage media managed by Appstore that distributes applications or a site, a server, and the like that supplies and distributes other various types of software. Examples of program instructions include both machine code, such as produced by a compiler, and files containing higher level code that may be executed by the computer using an interpreter.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

What is claimed is:

1. A hybrid video coding method of a computer apparatus comprising at least one processor, the hybrid video coding method comprising:
    generating, by the at least one processor, scaled-down video frames by scaling down frames of an original video;
    generating, by the at least one processor, a stream of a first layer by encoding the scaled-down video frames using a first encoder of a software codec;,
    generating, by the at least one processor, a stream of a second layer using the frames of the original video and using a second encoder of a hardware codec;
    decoding, by the at least one processor, the scaled-down video frames encoded using the first encoder, using a decoder of the software codec; and
    generating, by the at least one processor, scaled-up video frames by scaling up the decoded scaled-down video frames,
    wherein the generating the stream of the second layer comprises,
        generating differential images between the frames of the original video and the scaled-up video frames, and
        generating the stream of the second layer by encoding the generated differential images using the second encoder, and
    wherein the generating the differential images comprises calibrating a first range of pixel values of the differential images to be a second range of pixel values of the frames of the original video or a third range of pixel values of the scaled-up video frames.

2. The hybrid video coding method of claim 1, wherein the first range ranges from −(n+n+1) to (n+n+1), and the second range or the third range ranges from 0 to (n+n+1), and
    the calibrating comprises,
        changing a pixel value of less than −(n+1) with a pixel value of −(n+1) and changing a pixel value of greater than n with a pixel value of n among the pixel values of the differential images,
        adding n to each of the pixel values of the differential images, and
        the n denotes a natural number.

3. The hybrid video coding method of claim 1, further comprising:
    transmitting, by the at least one processor, at least one of the stream of the first layer and the stream of the second layer based on a resolution requested from a reception apparatus.

4. A non-transitory computer-readable record medium storing instructions that, when executed by at least one processor, cause a computer apparatus to perform the hybrid video coding method of claim 1.

5. A computer apparatus comprising:
    at least one processor configured to execute computer-readable instructions,
    wherein the at least one processor is configured to
        generate scaled-down video frames by scaling down frames of an original video,
        generate a stream of a first layer by encoding the scaled-down video frames using a first encoder of a software codec,
        generate a stream of a second layer using the frames of the original video and using a second encoder of a hardware codec,
        decode the scaled-down video frames encoded using the first encoder, using a decoder of the software codec, and
        generate scaled-up video frames by scaling up the decoded scaled-down video frames,
    wherein the at least one processor is further configured to,
        generate differential images between the frames of the original video and the scaled-up video frames, and
        generate the stream of the second layer by encoding the generated differential images using the second encoder, and
    wherein the at least one processor is further configured to generate the differential images by calibrating a first range of pixel values of the differential images to be a second range of pixel values of the frames of the original video or a third range of pixel values of the scaled-up video frames.

* * * * *